US012297989B2

(12) United States Patent
Daigle et al.

(10) Patent No.: US 12,297,989 B2
(45) Date of Patent: May 13, 2025

(54) LIGHTING FIXTURE FOR HOSPITALITY APPLICATIONS

(71) Applicant: Hubbell Incorporated, Shelton, CT (US)

(72) Inventors: Michael Daigle, Glastonbury, CT (US); Shawn Monteith, Burlington, CT (US)

(73) Assignee: Hubbell Incorporated, Shelton, CT (US)

(*) Notice: Subject to any disclaimer, the term of this patent is extended or adjusted under 35 U.S.C. 154(b) by 0 days.

(21) Appl. No.: 17/766,599

(22) PCT Filed: Oct. 7, 2020

(86) PCT No.: PCT/US2020/054561
§ 371 (c)(1),
(2) Date: Apr. 5, 2022

(87) PCT Pub. No.: WO2021/071936
PCT Pub. Date: Apr. 15, 2021

(65) Prior Publication Data

US 2024/0003527 A1 Jan. 4, 2024

Related U.S. Application Data

(60) Provisional application No. 62/911,484, filed on Oct. 7, 2019.

(51) Int. Cl.
*F21V 23/04* (2006.01)
*F21S 8/00* (2006.01)
(Continued)

(52) U.S. Cl.
CPC .......... *F21V 23/0435* (2013.01); *F21S 8/036* (2013.01); *F21V 23/023* (2013.01); *F21V 23/06* (2013.01);
(Continued)

(58) Field of Classification Search
CPC .... F21V 23/0435; F21V 23/023; F21V 23/06; H05B 47/17; H05B 47/19; F21S 8/036; F21Y 2115/10
See application file for complete search history.

(56) References Cited

U.S. PATENT DOCUMENTS 10,907,784 B2 * 2/2021 Chien .................... H01R 33/92
2005/0253538 A1 * 11/2005 Shah .................... H05B 47/195
315/362
(Continued)

OTHER PUBLICATIONS

International Search Report and Written Opinion mailed in Application No. PCT/US2020/054561, dated Jan. 12, 2021.
(Continued)

*Primary Examiner* — Mary Ellen Bowman
(74) *Attorney, Agent, or Firm* — Robinson + Cole LLP

(57) ABSTRACT

A lighting fixture is provided. The lighting fixture includes a light source. The lighting fixture further includes an input device physically located on the lighting fixture. The input device is configured to receive a manual user-input associated with toggling power to the light source. The lighting fixture further includes a wireless communications device physically located on the lighting fixture. The wireless communications device includes an antenna and one or more control devices. The one or more control devices are configured to obtain, via the antenna, data indicative of a user-request to toggle power to the light source. The one or more control devices are further configured to provide one or more control signals associated with toggling power to the light source based, at least in part, on the data and irrespective of a state of the input device physically located on the lighting fixture.

20 Claims, 8 Drawing Sheets

(51) Int. Cl.

| | |
|---|---|
| ***F21V 23/02*** | (2006.01) |
| ***F21V 23/06*** | (2006.01) |
| ***F21Y 115/10*** | (2016.01) |
| ***H05B 47/17*** | (2020.01) |
| ***H05B 47/19*** | (2020.01) |

(52) U.S. Cl.

CPC ............. *H05B 47/17* (2020.01); *H05B 47/19* (2020.01); *F21Y 2115/10* (2016.08)

(56) References Cited

U.S. PATENT DOCUMENTS

| | | | | |
|---|---|---|---|---|
| 2010/0039792 | A1 | 2/2010 | Meyers et al. | |
| 2017/0167705 | A1 | 6/2017 | Jacobson | |
| 2017/0374724 | A1 | 12/2017 | Liszt | |
| 2019/0289701 | A1* | 9/2019 | Oliver .................. | H05B 45/385 |

OTHER PUBLICATIONS

The extended European search report issued on Feb. 29, 2024, by the European Patent Office in corresponding European Patent Application No. 20874913.5. (9 pages).

* cited by examiner

LIGHTING FIXTURE FOR HOSPITALITY APPLICATIONS

RELATED APPLICATIONS

This application claims priority to U.S. Provisional Application No. 62/911,484, filed Oct. 7, 2019, the disclosures of which are incorporated herein by reference in their entirety and to which priority is claimed.

FIELD

The present disclosure relates generally to lighting fixtures and, more specifically, lighting fixtures for hospitality applications.

BACKGROUND

A lighting fixture can include a light source that provides illumination for a room or area in which the lighting fixture is mounted. The light source can be selectively coupled to a power supply (e.g., mains power supply) via manipulation (e.g., press, pull, etc.) of an input device. For instance, the input device can be a toggle physically located on the lighting fixture and movable between a first position and a second position toggle power to the light source. In this way, power to the light source can be toggled via manual user-input received at the toggle physically located on the lighting fixture.

BRIEF DESCRIPTION

Aspects and advantages of embodiments of the present disclosure will be set forth in part in the following description, or may be learned from the description, or may be learned through practice of the embodiments.

One example aspect of the present disclosure is directed to a lighting fixture. The lighting fixture includes a light source. The lighting fixture further includes an input device physically located on the lighting fixture. The input device is configured to receive a manual user-input associated with toggling power to the light source. The lighting fixture further includes a wireless communications device physically located on the lighting fixture. The wireless communications device includes an antenna and one or more control devices. The one or more control devices are configured to obtain, via the antenna, data indicative of a user-request to toggle power to the light source. The one or more control devices are further configured to provide one or more control signals associated with toggling power to the light source based, at least in part, on the data and irrespective of a state of the input device physically located on the lighting fixture.

These and other features, aspects and advantages of the present disclosure will become better understood with reference to the following description and appended claims. The accompanying drawings, which are incorporated in and constitute a part of this specification, illustrate embodiments of the present disclosure and, together with the description, serve to explain the principles of the disclosure.

BRIEF DESCRIPTION OF THE DRAWINGS

Detailed discussion of embodiments directed to one of ordinary skill in the art are set forth in the specification, which refers to the appended figures, in which.

DETAILED DESCRIPTION

Figure 1:
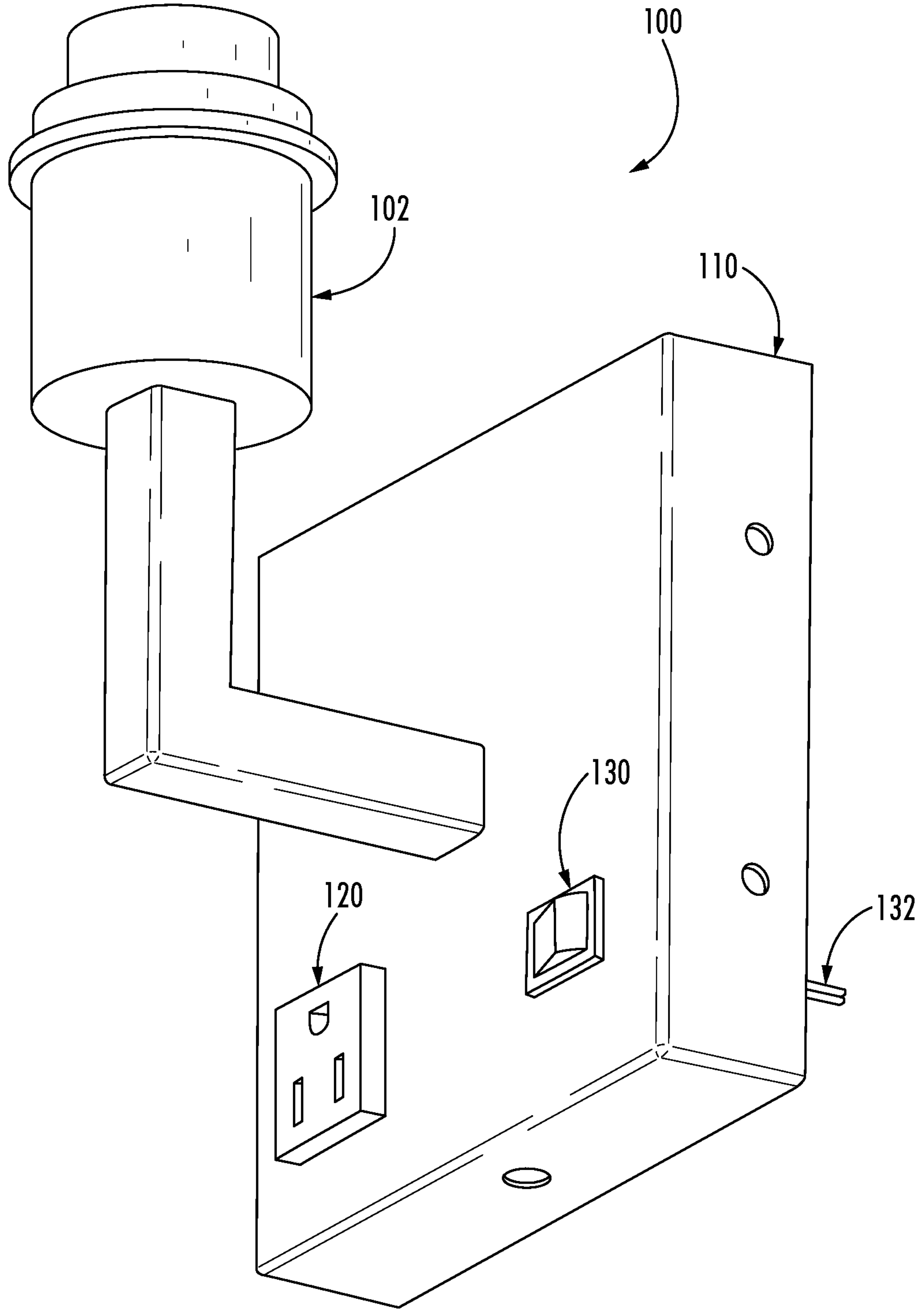
FIG. 1 depicts a lighting fixture according to example embodiments of the present disclosure.

Reference now will be made in detail to embodiments, one or more examples of which are illustrated in the drawings. Each example is provided by way of explanation of the embodiments, not limitation of the present disclosure. In fact, it will be apparent to those skilled in the art that various modifications and variations can be made to the embodiments without departing from the scope or spirit of the present disclosure. For instance, features illustrated or described as part of one embodiment can be used with another embodiment to yield a still further embodiment. Thus, it is intended that aspects of the present disclosure cover such modifications and variations.

Example aspects of the present disclosure are directed to lighting fixtures. Conventional lighting fixtures can include a light source and an input device configured to receive a manual user-input associated with toggling power to the light source. For example, in some implementations, the input device can be a toggle physically located on the lighting fixture and movable between at least a first position and a second position to toggle power to the light source. When the toggle is in the first position, the light source can be decoupled from a power source such that the light source does not illuminate a space in which the lighting fixture is located. Conversely, the light source can be coupled to the power source when the toggle is in the second position. Example lighting fixtures having such toggle physically located on the lighting fixture are commonly used, for instance, in hospitality applications (e.g., in hotel rooms). As will be discussed below, the present disclosure is directed to lighting fixtures in which users can toggle power to the light source without requiring a user to interact (e.g. touch, press, pull, etc.) with the input device.

In some implementations, lighting fixtures according to example aspects of the present disclosure can include a wireless communications device. The wireless communications device can include an antenna. The antenna can be configured to obtain one or more wireless signals associated with a user-request to toggle power to the light source of the lighting fixture. For instance, in some implementations, the user-request can be obtained via an audio input device associated with a digital assistant service (e.g., an audio-based digital assistant service). In this manner, the user-request can be provided via one or more voice commands (e.g., "Turn the light source off" or "Turn the light source on"). In some implementations, the wireless communications device can include circuitry to demodulate the one or more wireless signals to obtain data indicative of the user-request and to toggle power to the light source of the lighting fixture.

In some implementations, the wireless communications device can include one or more control devices. The one or more control devices can be configured to obtain the data indicative of the user-request to toggle power to the light source of the lighting fixture. The one or more control devices can be further configured to provide one or more control signals associated with toggling power to the light source based, at least in part, on the data. In this manner, power to the light source can be toggled without requiring a user to interact with the input device of the lighting fixture. Indeed, power to the light source can be toggled irrespective of a position of the toggle physically located on the lighting fixture.

In some implementations, lighting fixtures according to example aspects of the present disclosure can include a power device. The power device can include a switching device (e.g., a relay) configurable in at least a first state and a second state to selectively couple the light source to a power source. When the switching device is configured in the first state, the light source can be coupled to the power source via the switching device. In this manner, the light source can illuminate the space (e.g. hotel room) in which the lighting fixture is located when the switching device is configured in the second state. Conversely, the light source can be decoupled from the power source when the switching device is configured in the second state. In this manner, the light source does not illuminate the space in which the lighting fixture is located when the switching device is configured in the second state.

In some implementations, the power device can include one or more control devices operatively coupled to the switching device. In this manner, the one or more control devices of the power device can be configured to control operation of the switching device. For instance, the one or more control devices can be configured to provide one or more control signals to the switching device to configure the switching device in the first state such that the light source is coupled to the power source and emits light. The one or more control devices can be further configured to provide one or more control signals to the switching device to configure the switching device in the second state such that the light source is decoupled from the power source and no longer emits light.

In some implementations, the power device can include a power converter. The power converter can be configured to convert alternating current (AC) input power from the power source (e.g., AC mains) to direct current (DC) power for the one or more control devices of the power device. Furthermore, in some implementations, the DC power output by the power converter can be provided to the one or more control devices of the wireless communications device. More specifically, the DC power can be provided over one or more conductors coupling the power device to the wireless communications device.

In some implementations, the wireless communications device can be communicatively coupled to the input device via one or more conductors. In this manner, data indicative of the state of the input device can be provided to the wireless communications device via the one or more conductors. Furthermore, the one or more control devices of the wireless communications device can be configured to provide one or more control signals associated with toggling power to the light source based, at least in part, on the data indicative of the state of the input device received at the input device.

In some implementations, the wireless communications device can be communicatively coupled to the power device via one or more conductors. In this manner, the one or more control devices of the wireless communications device can communicate one or more control signals associated with toggling power to the light source to the one or more control devices of the power device. For example, the one or more control signals based, at least in part, on the data indicative of the user-request provided independent of the state of the input device of the lighting fixture can be provided to the one or more control devices of the device. Alternatively or additionally, the one or more control signals based, at least in part, on the data indicative of the state of the input device received at the input device can be provided to the one or more control devices of the power device. In this manner, the one or more control devices of the power device can be configured to provide one or more control signals to the switching device to configure the switching device in the first state or the second state based, at least in part, on the one or more control signals obtained from the wireless communications device.

Lighting fixtures according to the present disclosure can provide numerous technical benefits. For instance, the wireless communications device can allow users to toggle power to a light source without using the input device of the lighting fixtures and irrespective of a state of an input device physically located on the lighting fixture. In this manner, lighting fixtures according to the present disclosure can be more easily controlled with digital assistant services such that users can toggle power to the light source by providing one or more voice commands (e.g., "turn off light source" or "turn on light source") to a device associated with a digital assistant service.

Figure 2:
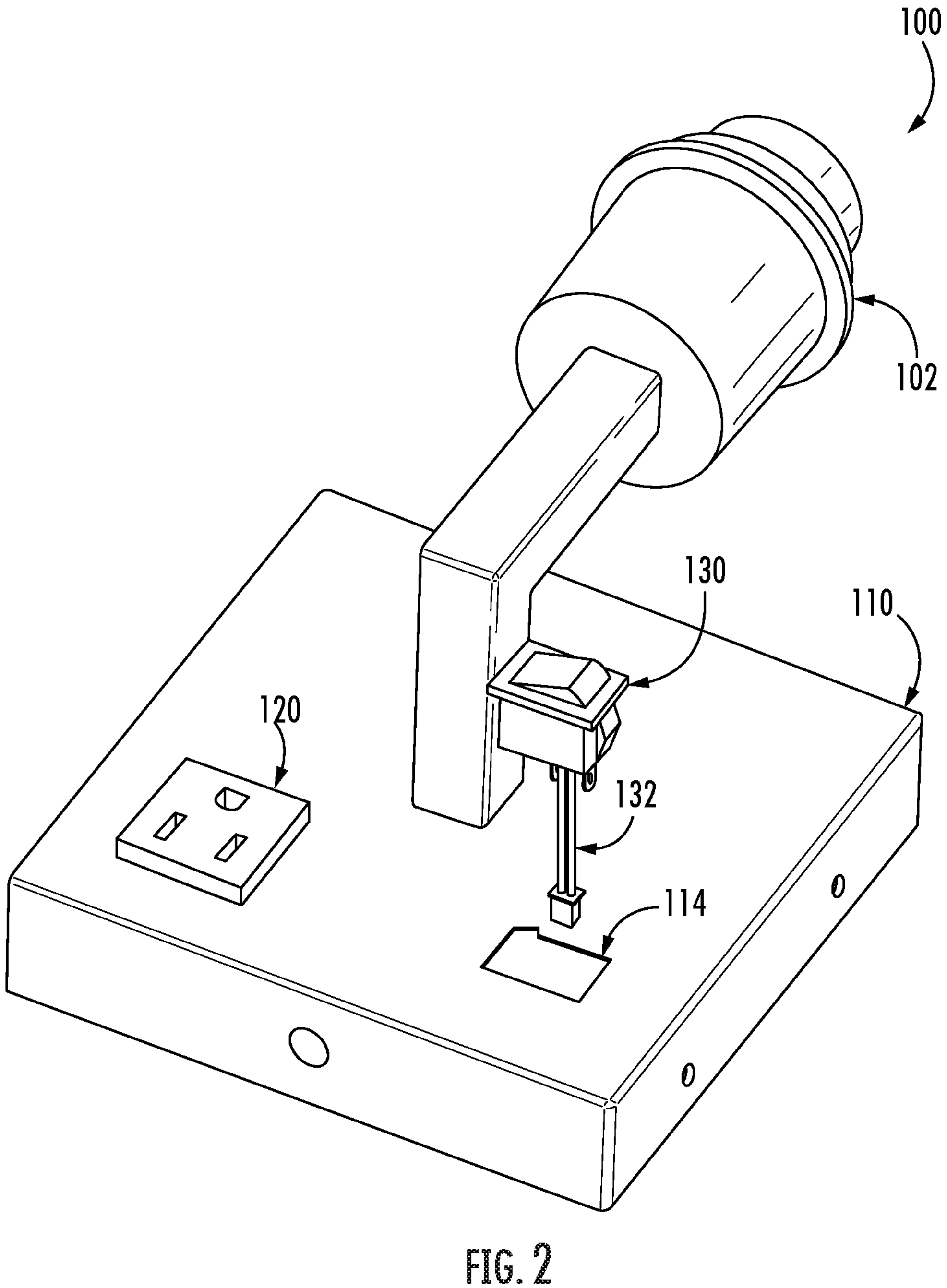
FIG. 2 depicts an input device removed from a housing of the lighting fixture of FIG. 1 according to example embodiments of the present disclosure.
Figure 3:
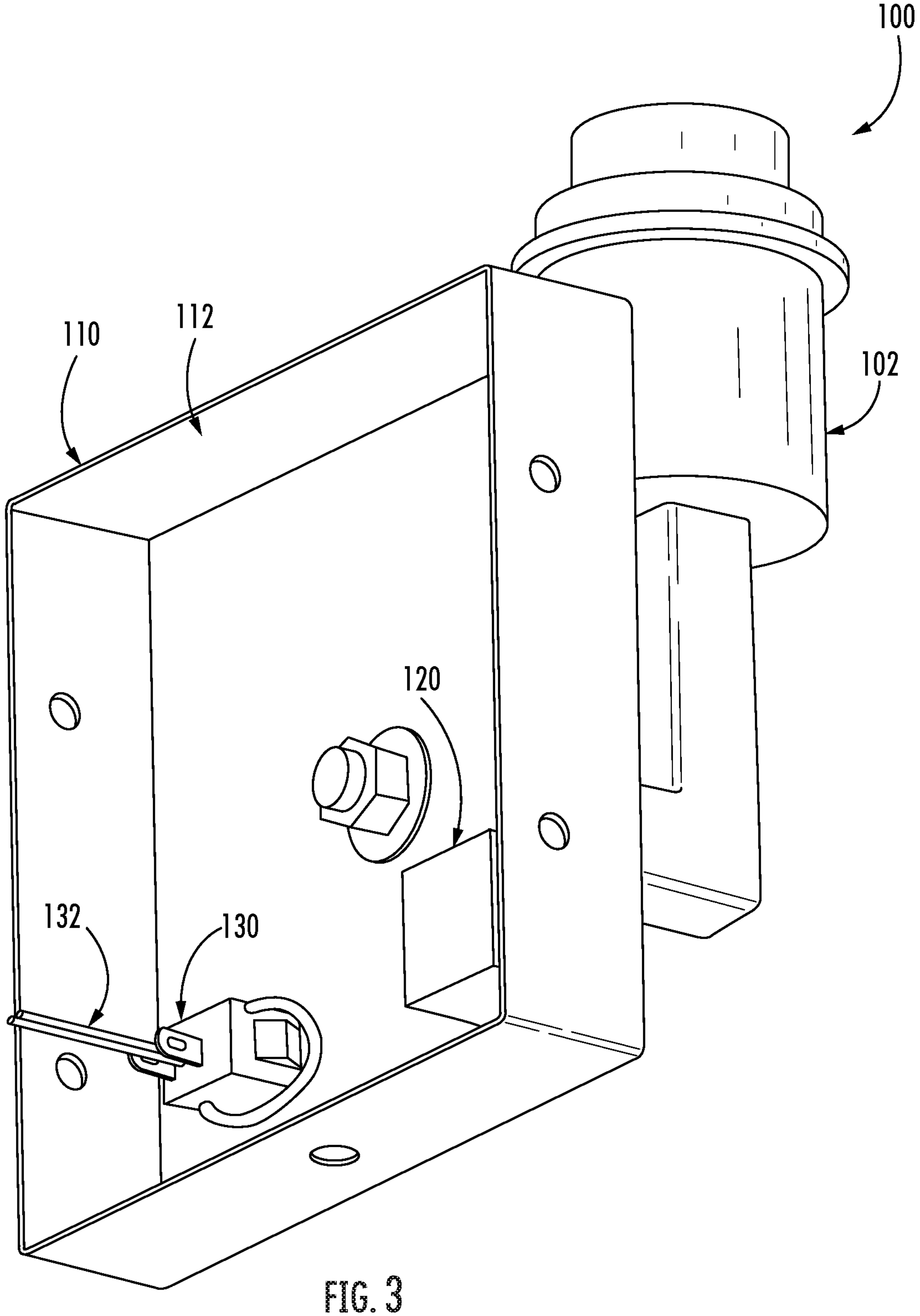
FIG. 3 depicts a cavity defined by a housing of the lighting fixture of FIG. 1 according to example embodiments of the present disclosure.

Referring now to the FIGS., FIGS. 1-3 depicts a lighting fixture 100 according to example embodiments of the present disclosure. As shown, the lighting fixture 100 can include a light source 102. The light source 102 can be configured to illuminate a space (e.g., hotel room) in which the lighting fixture 100 is located. In some implementations, the light source 102 can include one or more light emitting diode (LED) light sources. It should be understood, however, that the light source 102 can include any suitable type of light source. For example, in some implementations, the light source 102 can include one or more fluorescent light sources. In alternative implementations, the light source 102 can include one or more incandescent light sources.

As shown, the lighting fixture 100 can include a housing 110 defining a cavity 112. The cavity 112 can be configured to accommodate one or more electronic components of the lighting fixture 100. In some implementations, the housing 110 can be mounted to a surface (e.g., wall) associated with the space in which the lighting fixture 100 is located. In this manner, one or more electronic components positioned with the cavity 112 can be enclosed within the cavity 112 by the surface. As shown, in some implementations, the light source 102 can be removably coupled to the housing 110.

In some implementations, the lighting fixture 100 can include a power receptacle 120. It should be understood that the power receptacle 120 can be in electrical communication with a power source (e.g., AC mains) via one or more conductors (e.g., wires). In this manner, one or more devices (e.g., smartphones) can be plugged into the power receptacle 120 to facilitate charging of the one or more devices. Although the power receptacle 120 depicted in FIGS. 1 and 2 is a three-prong electrical outlet, it should be understood that any suitable type of power receptacle 120 can be used. For instance, in some implementations, the power receptacle 120 can be a two-prong electrical outlet. In some implementations, the power receptacle can include any suitable type of outlet associated with charging a device.

The lighting fixture 100 can include an input device 130. The input device 130 can be physically located on the lighting fixture 100. For instance, in some implementations, the input device 130 can be disposed within an opening 114 defined by the housing 110. In this manner, the input device 130 can be visible to a user when the housing 110 of the lighting fixture 100 is mounted to a surface (e.g., wall) associated with a space. As will be discussed below, the input device 130 can receive a manual user-input (e.g., press, pull, touch, etc.) associated with toggling power to the light source 102 of the lighting fixture 100.

In some implementations, the input device 130 can be a toggle movable between at least a first position and a second position to toggle power to the light source 102 of the lighting fixture 100. When the toggle is in the first position, the light source 102 can be coupled to a power source (e.g., AC mains) such that the light source 102 emits light to illuminate the space in which the lighting fixture 100 is located. Conversely, the light source 102 can be coupled to the power source when the toggle is in the second position such that the light source 102 no longer emits light. In this manner, a user can provide a manual user-input (e.g., press) at the toggle physically located on the lighting fixture 100 to move the toggle from the first position to the second position, or vice versa, to toggle power to the light source 102. It should be appreciated that the any suitable type of input device can be used to toggle power to the light source 102. For instance, in some implementations, the input device 130 can be a button that can be pressed to toggle power to the light source 102.

Figure 4:
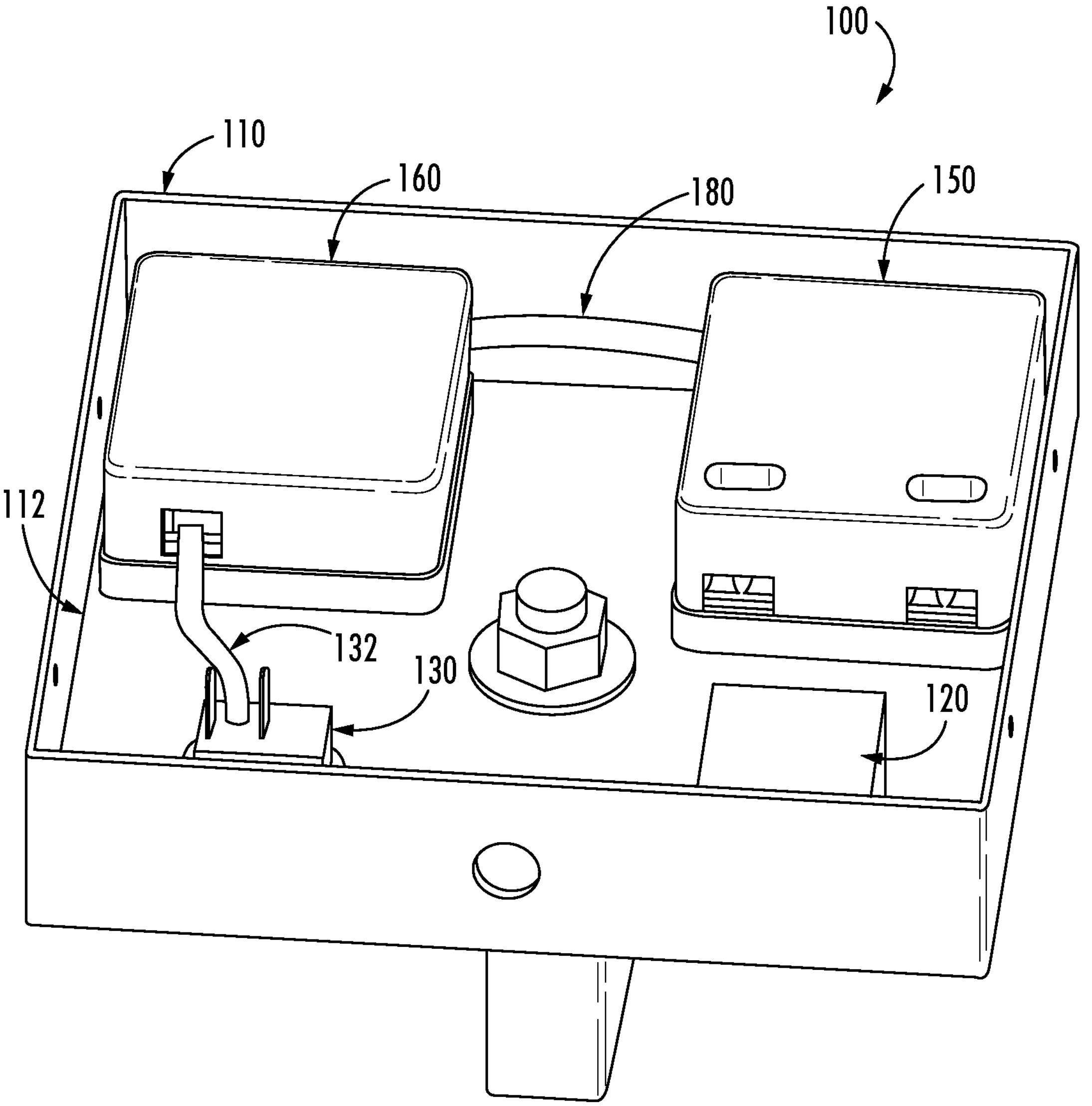
FIG. 4 depicts the wireless communications device and power device of FIG. 4 disposed within a cavity defined by a housing of the lighting fixture of FIG. 1 according to example embodiments of the present disclosure.
Figure 5:
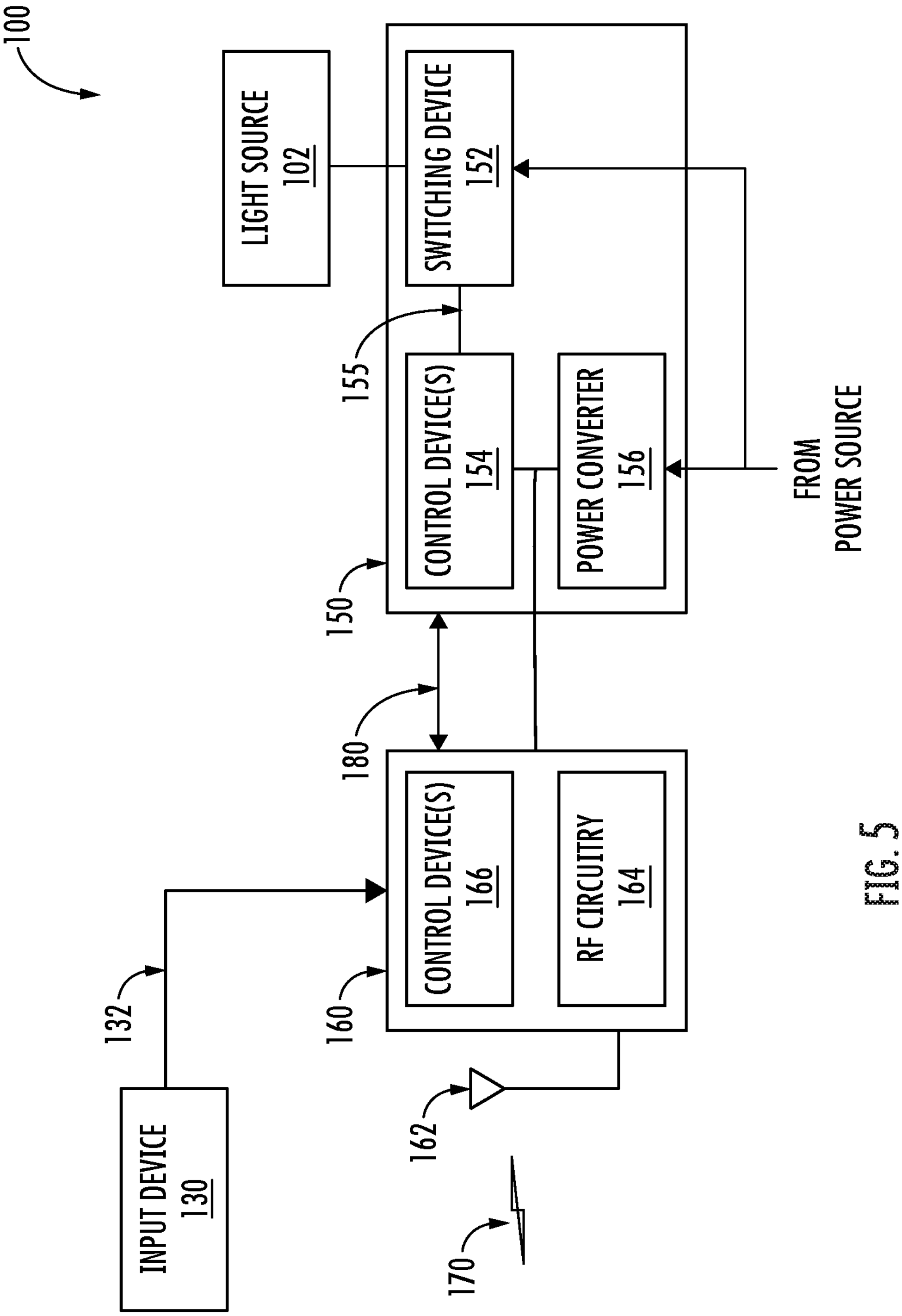
FIG. 5 depicts a block diagram of components of a wireless communications device and power device of a lighting fixture according to example embodiments of the present disclosure.

Referring now to FIGS. 4 and 5, the lighting fixture 100 can include a power device 150. As shown, the power device 150 can be secured to the housing 110 of the lighting fixture 100 such that the power device 150 is positioned within the cavity 112 defined by the housing 110. In this manner, the power device 150 can be enclosed within the cavity 112 when the lighting fixture 100 is mounted to a surface (e.g., wall) of the space in which the lighting fixture 100 is located. It should be appreciated that the power device 150 can be secured to the housing in any suitable manner. For instance, in some implementations, the power device 150 can be secured to a surface of the housing 110 via an adhesive type material (e.g., double-sided tape).

In some implementations, the power device 150 can include a switching device 152 coupled between the light source 102 of the lighting fixture 100 and a power source. The switching device 152 can be configured to selectively couple the light source 102 of the lighting fixture 100 to the power source (e.g., AC mains). In some implementations, the switching device 152 can be configurable in at least a first state and a second state. When the switching device 152 is configured in the first state, the light source 102 is coupled to the power source via the switching device 152 such that the light source 102 emits light. Conversely, when the switching device 152 is configured in the second state, the light source 102 is decoupled from the power source such that the light source no longer emits light.

It should be appreciated that the switching device 152 can include any suitable device configured to control power delivery to the load. For instance, in some implementations, the switching device 152 can include a contactor or relay. In alternative implementations, the switching device 152 can include one or more transistors, one or more silicon controlled rectifier (SCR), one or more TRIACs, relays, or any other suitable device configured to control power delivery to the light source 102.

In some implementations, the power device 150 can include one or more control devices 154. The one or more control devices 154 can be communicatively coupled to the switching device 152 via one or more conductors 155 (e.g., wires). In this manner, the one or more control devices 154 can provide one or more control signals to the switching device 152 via the one or more conductors 155. For example, the one or more control signals can be associated with configuring the switching device 152 in the first state to couple the light source 102 to the power source. Alternatively, the one or more control signals can be associated with configuring the switching device 152 in the second state to decouple the light source 102 from the power source.

Still referring to FIGS. 4 and 5, the lighting fixture 100 can include a wireless communications device 160. As shown, the wireless communications device 160 can be secured to the housing 110 of the lighting fixture 100 such that the wireless communications device 160 is positioned within the cavity 112 defined by the housing 110. In this manner, the wireless communications device 160 can be enclosed within the cavity 112 when the lighting fixture 100 is mounted to a surface (e.g., wall) of the space in which the lighting fixture 100 is located. It should be appreciated that the wireless communications device 160 can be secured to the housing 110 in any suitable manner. For instance, in some implementations, the wireless communications device 160 can be secured to the housing 110 via an adhesive type material (e.g., double-sided tape).

In some implementations, the wireless communications device 160 can include an antenna 162. As shown, the antenna 162 can obtain one or more wireless signals 170 associated with a user-request to toggle power to the light source 102 independent of a state of the input device 130 physically located on the lighting fixture 100. It should be understood that the one or more wireless signals 170 can be transmitted to the wireless communications device 160 using any suitable type of network. The wireless communications device 160 can further include RF circuitry 163. The RF circuitry 163 can be configured to demodulate the one or more wireless signals 170 to obtain data indicative of the user request to toggle power to the light source 102 independent of the state of the input device 130 physically located on the lighting fixture 100.

In some implementations, the wireless communications device 160 can include one or more control devices 164. The one or more control devices 164 can be configured to obtain the data indicative of the user-request to toggle power to the light source 102 independent of the state of the input device 130 physically located on the lighting fixture 100. The one or more control devices 164 can be further configured to provide one or more control signals associated with toggling power to the light source based, at least in part, on the data.

In some implementations, the wireless communications device 160 can be communicatively coupled to the input device 130 via one or more conductors 132. In this manner, data indicative of a state of the input device 130 can be provided to the wireless communications device 160 via the one or more conductors 132. In this manner, the one or more control devices 164 of the wireless communications device 160 can be configured to provide one or more control signals associated with toggling power to the light source 102 based, at least in part, on the state of the input device 130 physically located on the lighting fixture 100.

In some implementations, the wireless communications device 160 can be communicatively coupled to the power device 150 via one or more conductors 180. In this manner, the one or more control devices 164 of the wireless communications device 160 can communicate (e.g., transmit) one or more control signals associated with toggling power to the light source 102 to the one or more control devices 154 of the power device 150. For example, the one or more control signals based, at least in part, on the data indicative of the user-request provided independent of a state of the input device 130 physically located on the lighting fixture 100 can be provided to the one or more control devices 154 of the power device 150. Alternatively or additionally, the one or more control signals based, at least in part, on the data indicative of the state of the input device 130 physically located on the lighting fixture 100 can be provided to the one or more control devices 154 of the power device 150. In this manner, the one or more control devices 154 of the power device 150 can be configured to provide one or more control signals to the switching device 152 to configure the switching device 152 in the first state or the second state based, at least in part, on the one or more control signals obtained from the wireless communications device 160. As will be discussed below in more detail, users can toggle power to the light source 102 of the lighting fixture 100 by providing one or more voice commands to an audio input device associated with a digital assistant service.

Figure 6:
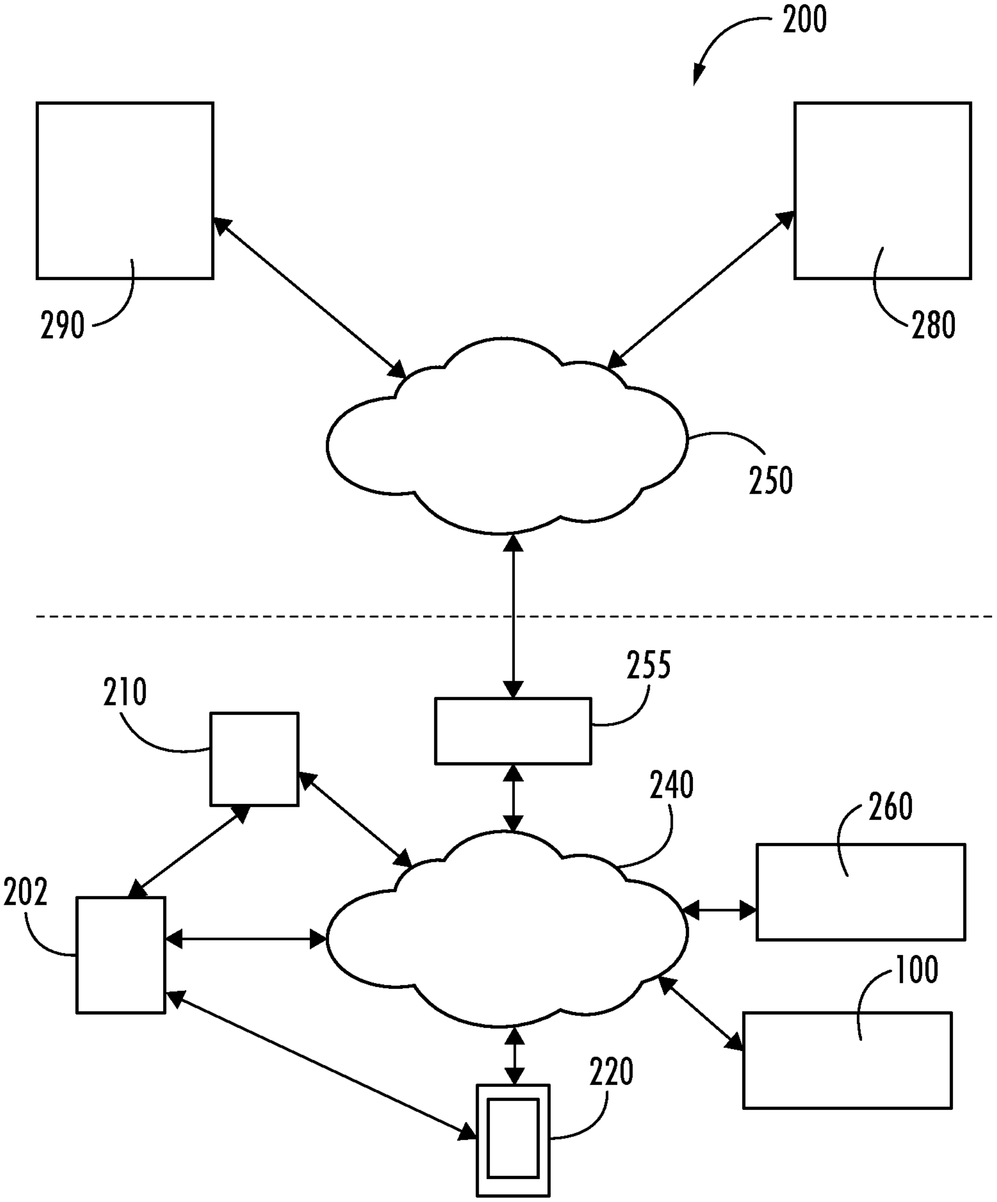
FIG. 6 depicts a system for remotely toggling power to a light source of a lighting fixture according to example embodiments of the present disclosure.

Referring now to FIG. 6, a system 200 for toggling power to a light source of a lighting fixture is provided according to example embodiments of the present disclosure. As shown, the system 200 can include one or more devices 202 (only one shown) associated with a digital assistant service. For instance, in some implementations, the one or more devices 202 can include one or more microphones configured to detect audio data. In this manner, the one or more devices 202 can obtain audio data indicative of one or more voice commands. More specifically, the one or more voice commands can be associated with toggling power to the light source 102 (FIG. 5) of the lighting fixture 100.

In some implementations, the one or more devices 202 associated with the digital assistant service can be in communication with user devices 220, 260. For instance, user devices 220, 260 can include one or more smartphones, laptops, desktops, tablets, wearable devices, media devices, displays with one or more processors, or other suitable devices. For instance, in some implementations, the one or more devices 202 can be in communication with the user devices 220, 260 via a direct communication link (e.g., direct wired or wireless communication link) or via a network, such as local area network 240. The direct communication link can be implemented, for instance, using Bluetooth low energy or other suitable communication protocol. In some implementations, a user can control, view information, and/or specify one or more settings associated with the one or more devices 202 via a graphical user interface implemented on a display of the user device 220, 260. For instance, a user can access an application implemented on the user device 220. The application can present a graphical user interface on a display of the user device 220. In this manner, a user can interact with the graphical user interface to control operation of the one or more devices 202.

The local area network 240 can be any suitable type of network or combination of networks that allows for communication between devices. In some embodiments, the network(s) can include one or more of a secure network, Wi-Fi network, IoT network, mesh network, one or more peer-to-peer communication links, and/or some combination thereof, and can include any number of wired or wireless links. Communication over the local area network 240 can be accomplished, for instance, via a communication interface using any type of protocol, protection scheme, encoding, format, packaging, etc.

As shown, the system 200 can include a gateway 255 that can allow access to a wide area network 250. The wide area network 250 can be, for instance, the Internet, cellular network, or other network, and can include any number of wired or wireless links. Communication over the wide area network 250 can be accomplished, for instance, via a communication interface using any type of protocol, protection scheme, encoding, format, packaging, etc. As shown, the connected devices 202 can communicate information over the wide area network 250 to remote computing system 280 and 290 and other remote computing devices via the gateway 255.

In some implementations, the remote computing system 280 can be associated with a cloud computing platform for implementation of one or more services for the one or more devices 202 associated with the digital assistant service. Data collected by the cloud computing platform can be processed and stored and provided, for instance, to the user device 220 (e.g., for presentation in a graphical user interface).

In some implementations, audio data collected via the one or more devices 202 associated with the digital assistant service can be communicated to the remote computing system 590 for processing of voice commands. For instance, in some implementations, the one or more voice commands can be associated with toggling power to the light source 102 (FIG. 1) of the lighting fixture 100. More specifically, the one or more voice commands can be associated with coupling the light source 102 to a power source such that the light source 102 illuminates a space in which the lighting fixture 100 is located. Alternatively, the one or more voice commands can be associated with decoupling the light source 102 form a power source such that the light source 102 does not illuminate the space in which the lighting fixture 100 is located.

In some implementations, data responsive to the voice commands can be communicated to the lighting fixture 100. More specifically, one or more wireless signals 170 (FIG. 5) can be provided to the wireless communications device 160 (FIG. 5) of the lighting fixture 100. As discussed above, the one or more control devices 164 of the wireless communications device 160 can demodulate the one or more wireless signals 170 to obtain data indicative of the user-request (e.g., voice commands) to toggle power to the light source 102 of the lighting fixture 100. Furthermore, the one or more control devices 164 can provide one or more control signals associated with toggling power to the light source 102 irrespective of a state of the input device 130 (FIG. 5) physically located on the lighting fixture 100. In this manner, users can toggle power to the light source 102 using one or more voice commands instead of the input device 130 (FIG. 5) of the lighting fixture 100.

The remote computing system 280 and 290 can include one or more computing devices. The one or more computing devices can include one or more processors and one or more memory devices. The remote computing systems 280 and 290 can be distributed such that its components are located in different geographic areas. The technology discussed herein refers to computer-based systems and actions taken by and information sent to and from computer-based systems. One of ordinary skill in the art will recognize that the inherent flexibility of computer-based systems allows for a great variety of possible configurations, combinations, and divisions of tasks and functionality between and among components. For instance, processes discussed herein may be implemented using a single computing device or multiple computing devices working in combination. Databases, memory, instructions, and applications may be implemented on a single system or distributed across multiple systems. Distributed components may operate sequentially or in parallel.

Figure 7:
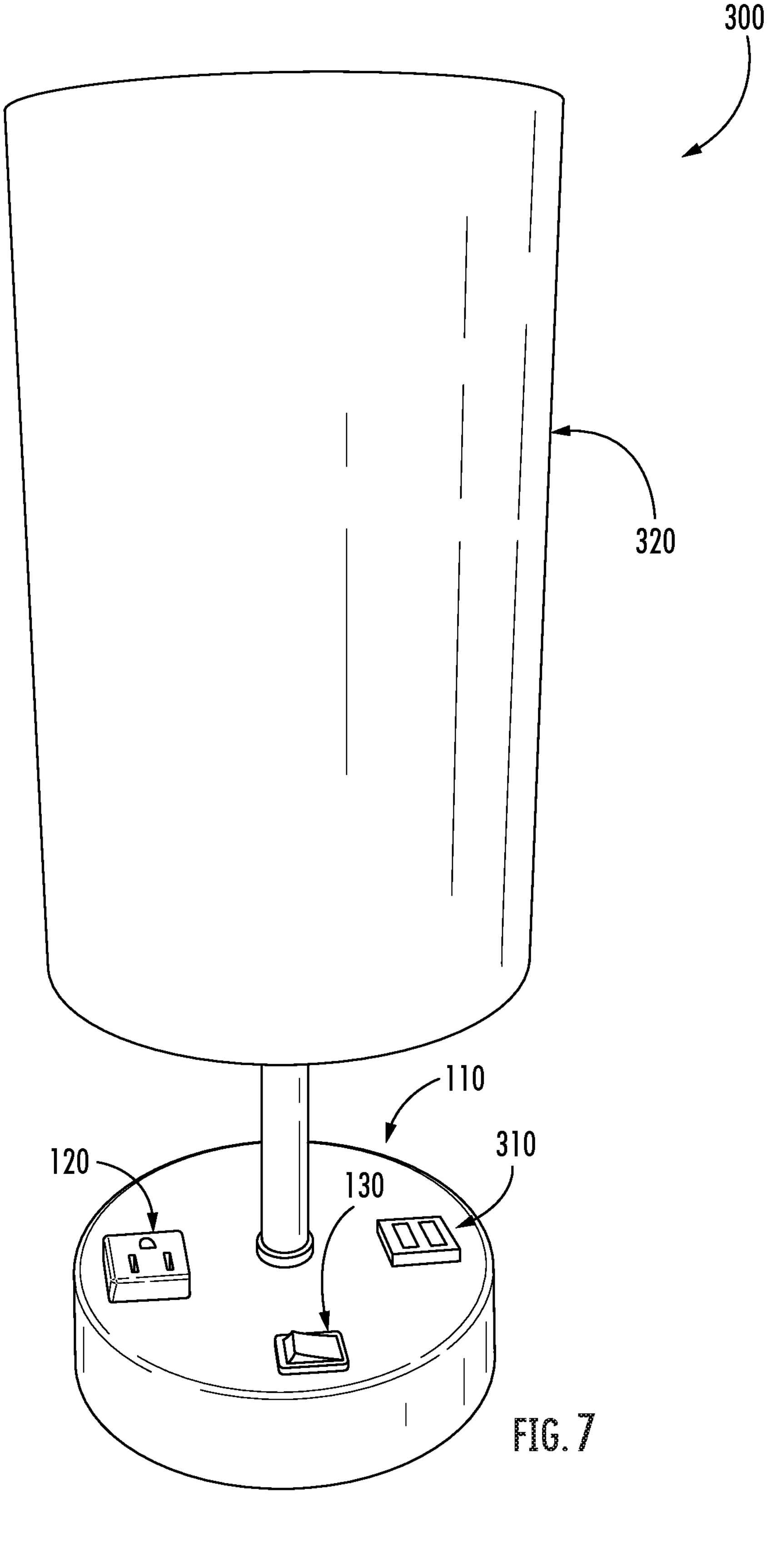
FIG. 7 depicts another lighting fixture according to example embodiments of the present disclosure.

FIG. 7 depicts another lighting fixture 300 according to example embodiments of the present disclosure. The lighting fixture 300 of FIG. 7 can be configured in substantially the same manner as the lighting fixture 100 discussed above with reference to FIGS. 1-4. For instance, the lighting fixture 300 can include the power receptacle 120 and the input device 130. However, in contrast to the lighting fixture 100 depicted in FIGS. 1-4, the lighting fixture 300 of FIG. 7 can include one or more charging outlets 310 coupled to a power source. In this manner, an electronic device (e.g., smartphone, tablet, laptop, etc.) plugged into the one or more charging outlets 310 to charge. In some implementations, the one or more charging outlets 310 can include a USB charging port. It should be appreciated, however, that the lighting fixture 300 can include any suitable type of charging outlets.

As shown, in some implementations the lighting fixture 300 can be configured as a lamp. More specifically, the lighting fixture 300 can include a lamp shade 320 in which the light source (not shown) can be positioned. It should be appreciated, however, that the lighting fixture 300 can be configured in any suitable manner. For instance, in some implementations, the lighting fixture 300 can be configured as a wall sconce similar to the lighting fixture 100 depicted in FIGS. 1-4.

Figure 8:
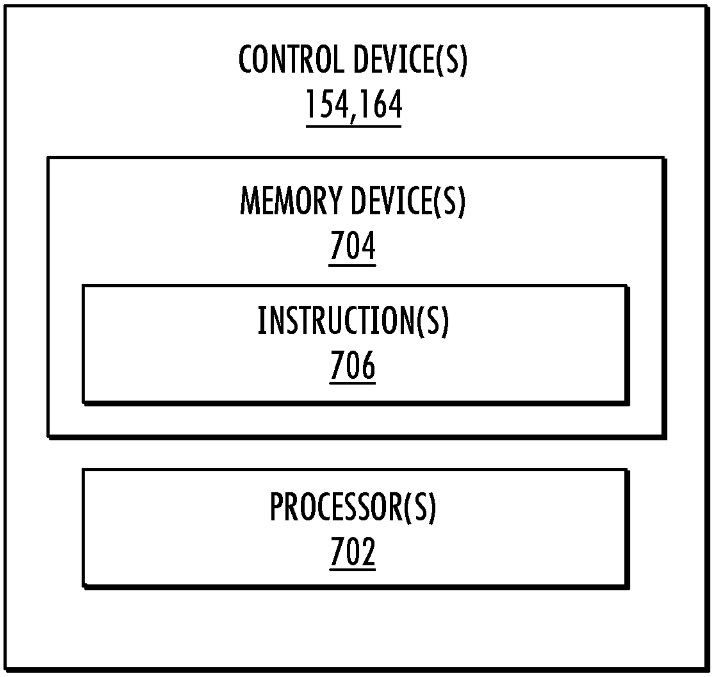
FIG. 8 depicts components of a control device according to example embodiments of the present disclosure.

FIG. 8 illustrates one embodiment of suitable components of control devices 154, 164. As shown, the control devices 154, 164 can include one or more processors 702 configured to perform a variety of computer-implemented functions (e.g., performing the methods, steps, calculations and the like disclosed herein). As used herein, the term "processor" refers not only to integrated circuits referred to in the art as being included in a computer, but also refers to a controller, microcontroller, a microcomputer, a programmable logic controller (PLC), an application specific integrated circuit (ASIC), a Field Programmable Gate Array (FPGA), and other programmable circuits.

As shown, the control devices 154, 164 can include a memory device 704. Examples of the memory device 704 can include computer-readable media including, but not limited to, non-transitory computer-readable media, such as RAM, ROM, hard drives, flash drives, or other suitable memory devices. The memory device 704 can store information accessible by the processor(s) 702, including computer-readable instructions 706 that can be executed by the processor(s) 702. The computer-readable instructions 706 can be any set of instructions that, when executed by the processor(s) 702, cause the processor(s) 702 to perform operations. The computer-readable instructions 706 can be software written in any suitable programming language or can be implemented in hardware.

In some implementations, the computer-readable instructions 706 can be executed by the processor(s) 702 to perform operations, such as providing one or more control signals associated with configuring the switching device 152 (FIG. 5) in a first state or a second state to selectively couple the light source 102 (FIG. 1) of the lighting fixture 100 to a power source.

While the present subject matter has been described in detail with respect to specific example embodiments thereof, it will be appreciated that those skilled in the art, upon attaining an understanding of the foregoing may readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be readily apparent to one of ordinary skill in the art.

What is claimed is:

1. A lighting fixture, comprising:

a light source;

an input device physically located on the lighting fixture, the input device configured to receive a manual user-input associated with toggling power to the light source; and a wireless communications device physically located on the lighting fixture, the wireless communication device comprising an antenna and one or more control devices, the one or more control devices configured to:

obtain, via the antenna, data indicative of a user-request to toggle power to the light source; and provide one or more control signals associated with toggling power to the light source based, at least in part, on the data and irrespective of a state of the input device physically located on the lighting fixture.

2. The lighting fixture of claim 1, wherein the wireless communications device is communicatively coupled to the input device via one or more conductors.

3. The lighting fixture of claim 1, further comprising:

a power receptacle physically located on the lighting fixture.

4. The lighting fixture of claim 1, further comprising:

a power device comprising a switching device configurable in at least a first state and a second state to selectively couple the light source to a power source.

5. The lighting fixture of claim 4, wherein the switching device comprises a relay.

6. The lighting fixture of claim 4, wherein the one or more control signals are associated with configuring the switching device in the first state or the second state to toggle power to the light source irrespective of a state of the input device.

7. The lighting fixture of claim 4, wherein the wireless communications device is coupled between the input device and the power device.

8. The lighting fixture of claim 4, wherein the power device further comprises a power converter configured to convert alternating current (AC) input power from a power source to direct current (DC) power for the wireless communications device.

9. The lighting fixture of claim 4, wherein the power device further comprises one or more control devices configured to:

obtain the one or more control signals associated with toggling power to the light source irrespective of the state of the input device; and configure the switching device in the first state or the second state based, at least in part, on the one or more control signals.

10. A lighting fixture, comprising:

a light source;

a housing;

a toggle disposed within an opening defined by the housing, the toggle movable between at least a first position and a second position to toggle power to the light source; and a wireless communications device disposed within a cavity defined by the housing, the wireless communications device comprising an antenna and one or more control devices, the one or more control devices configured to:

obtain, via the antenna, data indicative of a user-request to toggle power to the light source; and provide one or more control signals associated with toggling power to the light source based, at least in part, on the data and irrespective of a position of the toggle.

11. The lighting fixture of claim 10, wherein the wireless communications device is communicatively coupled to the toggle via one or more conductors.

12. The lighting fixture of claim 10, further comprising: a power device disposed within the cavity, the power device comprising a switching device configured to selectively couple the light source to a power source.

13. The lighting fixture of claim 12, wherein the wireless communications device is coupled between an input device and the power device.

14. The lighting fixture of claim 12, wherein the power device further comprises a power converter configured to convert alternating current (AC) power from a power source to direct current (DC) power for the wireless communications device.

15. The lighting fixture of claim 10, further comprising:

a power receptacle disposed within an opening defined by the housing.

16. The lighting fixture of claim 10, wherein the one or more control devices are further configured to:

obtain data indicative of a position of the toggle; and provide one or more control signals associated with toggling power to the light source based, at least in part, on the data indicative of the position of the toggle.

17. The lighting fixture of claim 10, wherein the light source comprises one or more light emitting diode (LED) light sources.

18. The lighting fixture of claim 10, further comprising:

one or more charging outlets coupled to a power source.

19. The lighting fixture of claim 18, wherein the one or more charging outlets comprise a USB outlet.

20. The lighting fixture of claim 1, wherein, the input device is configured to receive a first input to toggle the light source to an illuminated state and a second input to toggle the light source to a darkened state;

the wireless communications device is configured to receive a third input to toggle the light source to the illuminated state and a fourth input to toggle the light source to the darkened state;

receipt of the third input and the fourth input are configured to toggle the light source between the illuminated state and the darkened state after receipt of the first input by the input device; and receipt of the third input and the fourth input are configured to toggle the light source between the illuminated state and the darkened state after receipt of the second input by the input device.

* * * * *